US012637104B2

(12) United States Patent (10) Patent No.: US 12,637,104 B2
Wiberg et al. (45) Date of Patent: May 26, 2026

(54) REDUCING WEAR ON PATHS

(71) Applicant: Volvo Autonomous Solutions AB, Gothenburg (SE)

(72) Inventors: Wilhelm Wiberg, Askim (SE); Oskar Ljungqvist, Sätila (SE); Calle Skillsäter, Torshälla (SE); Johan Sjöberg, Västerås (SE)

(73) Assignee: Volvo Autonomous Solutions AB, Gothenburg (SE)

( * ) Notice: Subject to any disclaimer, the term of this patent is extended or adjusted under 35 U.S.C. 154(b) by 16 days.

(21) Appl. No.: 18/543,669

(22) Filed: Dec. 18, 2023

(65) Prior Publication Data

US 2024/0199076 A1 Jun. 20, 2024

(30) Foreign Application Priority Data

Dec. 19, 2022 (EP) ..................................... 22214550

(51) Int. Cl.
B60W 60/00 (2020.01)

(52) U.S. Cl.
CPC ..... B60W 60/0011 (2020.02); *B60W 2530/10* (2013.01); *B60W 2552/35* (2020.02)

(58) Field of Classification Search
CPC ......... B60W 60/0011; B60W 2530/10; B60W 2552/35; B60W 40/06; G01C 21/3453; G01C 21/3492; G01C 21/34
USPC ......... 701/533, 117, 410, 423, 23, 400, 414, 701/532, 25, 1, 420, 408, 26, 527, 65, 701/467, 445, 468, 409
See application file for complete search history.

(56) References Cited

U.S. PATENT DOCUMENTS

| | | | |
|---|---|---|---|
| 2014/0012432 A1* | 1/2014 | Lynar ................... | G08G 1/0145 |
| | | | 701/1 |
| 2014/0067265 A1 | 3/2014 | Maston | |
| 2018/0046195 A1* | 2/2018 | Nakamura .......... | B60W 50/082 |
| 2018/0314258 A1* | 11/2018 | Brew .................... | B60W 40/06 |
| 2020/0079388 A1* | 3/2020 | Kenyon .............. | G08G 1/0145 |
| 2020/0164884 A1* | 5/2020 | Ebe ........................ | B60W 40/06 |
| 2021/0096570 A1* | 4/2021 | Engle ................... | G05D 1/0276 |
| 2021/0163014 A1* | 6/2021 | Kimura ................ | B60W 40/06 |

(Continued)

FOREIGN PATENT DOCUMENTS

DE 102016215932 A1 3/2018

OTHER PUBLICATIONS

Extended European Search Report in corresponding European Application No. 22214550.0 dated Jun. 16, 2023 (9 pages).
(Continued)

*Primary Examiner* — Anne Marie Antonucci
*Assistant Examiner* — Jodi Jones
(74) *Attorney, Agent, or Firm* — Jeffri A. Kaminski; Venable LLP

(57) ABSTRACT

A computer system comprising a processor device configured to determine at least one travelling path for at least one vehicle is provided. The processor device is further configured to obtain an indication of wear of a drivable surface. The drivable surface comprising a set of surface areas. The indication of wear is indicative of a wear of each respective surface area in the set of surface areas. The processor device is further configured to, based on the indicated wear of the set of surface areas of the drivable surface, determine the at least one travelling path for the at least one vehicle.

14 Claims, 6 Drawing Sheets

(56)      References Cited

U.S. PATENT DOCUMENTS

| | | | |
|---|---|---|---|
| 2022/0252414 A1* | 8/2022 | Lerner | G06Q 30/0283 |
| 2023/0419687 A1* | 12/2023 | Jumonji | G06V 10/809 |
| 2024/0110800 A1* | 4/2024 | Herrou | G01C 21/3697 |

OTHER PUBLICATIONS

European Communication pursuant to Article 94(3) EPC dated Dec. 15, 2025 in corresponding European Patent Application No. 22214550. 0, 6 pages.

* cited by examiner

REDUCING WEAR ON PATHS

TECHNICAL FIELD

The disclosure relates generally to path determination for vehicles. In particular aspects, the disclosure relates to reducing wear on paths. The disclosure can be applied in heavy-duty vehicles, such as trucks, buses, and construction equipment. Although the disclosure may be described with respect to a particular vehicle, the disclosure is not restricted to any particular vehicle.

BACKGROUND

When autonomous vehicles travel predefined paths, the vehicles typically follow the predefined paths with a very high precision. This is since their navigation systems may be very precise and wheels of the autonomous vehicle may follow the predefined path up to a centimeter level precision. This means that the wear of the predefined path will be exaggerated, and ruts, ridges, deformations and potholes will emerge quickly as wheels will travel at the exact same place in the predefined path. The problem occurs for a single vehicle iterating the same predefined path and/or if many vehicles are driving the same predefined path. This means that vehicles will operate at a lower performance as the path may have worse traction and wheels may slip into ruts or potholes of the predefined path. In this way, maintenance of the predefined path may need to be performed often to ensure an even surface for vehicles to travel on. Furthermore, maintenance brings productivity down as vehicles operating in the predefined path needs to stop and wait for the maintenance to finish. Hence, there is a strive to more efficiently handle the wear caused by vehicles travelling a predefined path.

SUMMARY

According to a first aspect of the disclosure, a computer system comprising a processor device configured to determine at least one travelling path for at least one vehicle is provided. The processor device is further configured to obtain an indication of wear of a drivable surface. The drivable surface comprises a set of surface areas. The indication of wear is indicative of a wear of each respective surface area in the set of surface areas. The processor device is further configured to, based on the indicated wear of the set of surface areas of the drivable surface, determine the at least one travelling path for the at least one vehicle.

The first aspect of the disclosure may seek to reduce wear of the at least one travelling path. A technical benefit may include reducing the wear of the at least one travelling path. This is since the at least one travelling path for the at least one vehicle is determined based on the indicated wear of the set of surface areas of the drivable surface.

In other words, the wear of the at least one travelling path is considered when determining the at least one travelling path and thereby surface areas which are already worn out may be avoided when the at least one travelling path is determined. In this way, the at least one travelling path will be evenly worn, or at least less unevenly worn, thereby improving the lifetime of the drivable surface.

When driving on an even path, wear is further reduced as an even driving surface is less affected by wear, and hence, as the drivable surface will be more evenly worn, or at least less unevenly worn, the overall wear is reduced. This is since, when ruts have started to form, wear is typically accelerated since vehicles may be likely to slip into the ruts which further increases wear, which is avoided by determining the at least one travelling path based on the indicated wear of the set of surface areas.

Determining the at least one travelling path for the at least one vehicle based on the indicated wear of the set of surface areas of the drivable surface further improves performance and productivity for the at least one vehicle which will travel the determined at least one travelling path. This is since the at least one travelling path will be more evenly worn when the at least one travelling path is determined based on the indicated wear, and thereby causing a more even surface, or at least less uneven surface, which improves the performance and productivity due to smoother operations of the at least one vehicle.

Furthermore, as the wear is reduced in the drivable surface, maintenance of the drivable surface can be deferred until a later point in time. This increases productivity as the at least one vehicle needs to be stopped less often due to maintenance.

According to a second aspect of the disclosure, a computer-implemented method for determining at least one travelling path for at least one vehicle is provided. The method comprises:

by a processor device of a computer system, obtaining an indication of wear of a drivable surface comprising a set of surface areas, and wherein the wear is indicative of a respective wear of each respective surface area in the set of surface areas, by the processor device, based on the indicated wear of the set of surface areas of the drivable surface, determining the at least one travelling path for the at least one vehicle.

The second aspect of the disclosure may seek to reduce wear of the at least one travelling path. A technical benefit may include reducing the wear of the at least one travelling path. This is since the at least one travelling path for the at least one vehicle is determined based on the indicated wear of the set of surface areas of the drivable surface. The technical benefit further corresponds to the technical benefit of the first aspect.

In some examples, the drivable surface may comprise any surface which can be prone to wear. In a particular example, the drivable surface may comprise any surface which is easily affected by loads applied by vehicles, e.g., soft surfaces, such as any one or more out of: sand, gravel, dirt, snow, mud, areas with puddles/water, and/or a combination thereof.

In some examples, the set of surface areas are arranged as a grid over the drivable surface. In this way, a more fine-granular way of obtaining the wear of the drivable surface is achieved. This allows for a more even distribution of wear of the path, e.g., as the wear will be indicative of each part of the grid over the drivable surface, and thereby the distribution of the wear can be controlled more accurately, which improves performance and productivity of the at least one vehicle, and further improves lifetime of the path as the overall wear is reduced by the more even distribution of wear.

In some examples, the drivable surface comprises one or more segments wherein each respective segment comprises at least two adjacent surface areas in at least two different directions of the respective segment.

In this way, a more fine-granular way of obtaining the wear of the drivable surface is achieved. This allows for a more even distribution of wear of the path, e.g., as the wear will be indicative of the at least two adjacent surface areas in at least two directions for one or more segments, and thereby the distribution of the wear can be controlled more accurately which improves performance and productivity of the at least one vehicle, and further improves lifetime of the path as the overall wear is reduced by the more even distribution of wear.

The one or more segments and/or the grid over the drivable surface may be combinable alternatives for how to achieve a more fine-granular control over the distribution of wear of the drivable surface.

In some examples, the wear of each respective surface area is represented by a respective wear value. In these examples, each respective wear value is determined based on a wear caused by one or more second vehicles that have travelled across the respective surface area.

In other words, the wear caused by the one or more second vehicles that have travelled across the respective surface area may be quantified into respective wear values. In this way, wear distribution can be distributed more evenly over the drivable surface as the wear values can be used to more accurately determine the at least one travelling path.

In some examples, the wear value is determined based on any one or more out of:

a number of times the respective surface area has been travelled by a ground engaging member of the one or more second vehicles, at least one sensor measurement of the respective surface area, the at least one sensor measurement being performed by the one or more second vehicles, a number of times the respective surface area has been travelled by a specific vehicle type, a total load that has been applied to the respective surface area by the one or more second vehicles, and/or a default wear value.

In this way, a more even wear distribution is achieved. This is since the wear value can accurately indicate an actual wear of the respective surface area and thereby the at least one travelling path can be determined to result in a more even wear of the drivable surface.

In some examples, the wear value is determined at least partly based on one or more wear factors that have been applied to the respective surface area when travelled by at least one respective vehicle out of the one or more second vehicles.

The one or more wear factors may comprise any one or more out of:

a speed of the at least one respective vehicle, a longitudinal acceleration of the at least one respective vehicle, a lateral acceleration of the at least one respective vehicle, a type of the at least one respective vehicle, a weight of the at least one respective vehicle, a load of the at least one respective vehicle, e.g., including or excluding weight of the at least one respective vehicle, a surface type of the respective surface area, and an environmental status of the respective surface area when travelled by the at least one respective vehicle.

In this way, a more even wear distribution is achieved. This is since the wear value more accurately indicates an actual wear of the respective surface area and thereby the at least one travelling path can be determined to result in a more even wear of the drivable surface.

In some examples, determining the at least one travelling path for the at least one vehicle comprises determining at least one travelling path which causes each one of the at least one vehicle to travel over a subset of surface areas out of the set of surface areas. The subset of surface areas fulfils a first condition.

In this way, the at least one travelling path can be determined with higher accuracy, i.e., a more even wear distribution is achieved. This is since the travelling path can be selected such that it travels over a subset of surface areas which fulfils the first condition. The condition can be set such that the drivable surface is worn evenly, or at least less unevenly. For example, fulfilling the first condition comprises any one or more out of:

that the subset of surface areas comprises at least one surface area which from the set of surface areas has a lowest wear value, that the wear values within the subset of surface areas are lower than a maximum wear value, that a total wear value of the subset of surface areas is less than an alternative total wear value for an alternative travelling path comprising an alternative set of surface areas, that at least one surface area in the set of surfaces areas which is prone to an increased wear is excluded from the subset of surface areas, that the at least one travelling path comprises a lower number of high wear operations than an alternative travelling path, the high wear operations causing a vehicle to induce higher wear on a surface area than for an alternative operation, and that a difference in wear values of one or more adjacent areas out of the set of surface areas is lowered.

In some examples, determining the at least one travelling path for the at least one vehicle comprises determining a first travelling path for a first vehicle and a second travelling path for a second vehicle, wherein the first vehicle is arranged to cause more wear than the second vehicle, and determining a first travelling path which causes the first vehicle to travel over a first subset of surface areas out of the set of surface areas, wherein a wear of the first subset of surface areas is represented by a first total wear value, and determining a second travelling path which causes the second vehicle to travel over a second subset of surface areas out of the set of surface areas, wherein a wear of the second subset of surface areas is represented by a second total wear value, and wherein the first total wear value is lower than the second total wear value.

In this way, a more even wear on the drivable surface is achieved. This is since the at least one travelling path is determined such that the first vehicle causing more wear, e.g., a heavier or more loaded vehicle, is determined to travel the first travelling path with a lower wear value instead of travelling the second travelling path where it would cause increased wear to an already relatively worn-out path. In other words, determining the at least one travelling path, in these examples, comprises determining where different vehicles of the at least one vehicle shall drive to best even out wear on the drivable surface.

In some examples, obtaining the indication of wear of the drivable surface comprises obtaining a wear for each respective surface area by receiving, from at least one respective vehicle out of one or more second vehicles, a respective indication of wear of the drivable surface. The indication of wear of the drivable surface may have been estimated and/or measured by the at least one respective vehicle out of one or more second vehicles.

In this way, a more accurate indication of wear is achieved, thereby improving accuracy in the determination of the at least one travelling path to even out the distribution of wear on the drivable surface.

In some examples, each respective surface area out of the set of surface areas has a dynamically set area size. In this way, a more accurate indication of wear is achieved. This is since wear can be more fine-granular where needed and thereby improve accuracy of determining the at least one travelling path to even out the distribution of wear on the drivable surface. For example, predefined areas e.g., which are known to likely have lots of wear, e.g., curves, hills, etc., may have more fine granular surface areas. A shape of each respective surface area may be of any suitable type.

According to a third aspect of the disclosure, a vehicle comprising a computer system is provided. The computer system may be the computer system of the first aspect. The computer system may be configured to perform the method of the first aspect. The vehicle is at least partly autonomous.

According to a fourth aspect of the disclosure, a computer program product is provided. The computer program product comprises program code for performing, when executed by a processor device, the method of the second aspect.

According to a fifth aspect of the disclosure, a control system is provided. The control system comprises one or more control units configured to perform the method of the second aspect.

According to a sixth aspect of the disclosure, a non-transitory computer-readable storage medium is provided. The non-transitory computer-readable storage medium comprises instructions, which when executed by the processor device, cause the processor device to perform the method of the second aspect.

Technical benefits of the third, fourth, fifth, and sixth aspects may respectively correspond to the technical benefits of the first and/or second aspects.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

Embodiments herein relates to reducing wear on paths. This may particularly be relevant when a surface is soft and/or affected by a load being applied to it easily. The embodiments herein in particularly may relate to autonomous vehicles. This is since for autonomous vehicles and at least partly autonomous vehicles, navigation systems and vehicle control may be so precise that when driving repeatedly the same pre-defined mission, i.e. predefined paths, the at least partly autonomous vehicle(s) will follow the same path by a very small error margin, i.e. smaller than a predefined threshold. This leads to an increased wear over time of the road, where ruts, ridges, deformations and potholes may quickly start to form which both increases a need for maintenance of the path and will affect the performance of the vehicle control, as the ruts, ridges, deformations and potholes will be a disturbance to the vehicle. For example, when driving in deep tire tracks, a vehicle will want to stay in the tire tracks, pulling the vehicle back to the track when trying to control the vehicle. Such a scenario deteriorates the control and productivity of a vehicle. Hence, there is a need to reduce road wear for predefined paths travelled by one or more vehicles.

Figure 1:
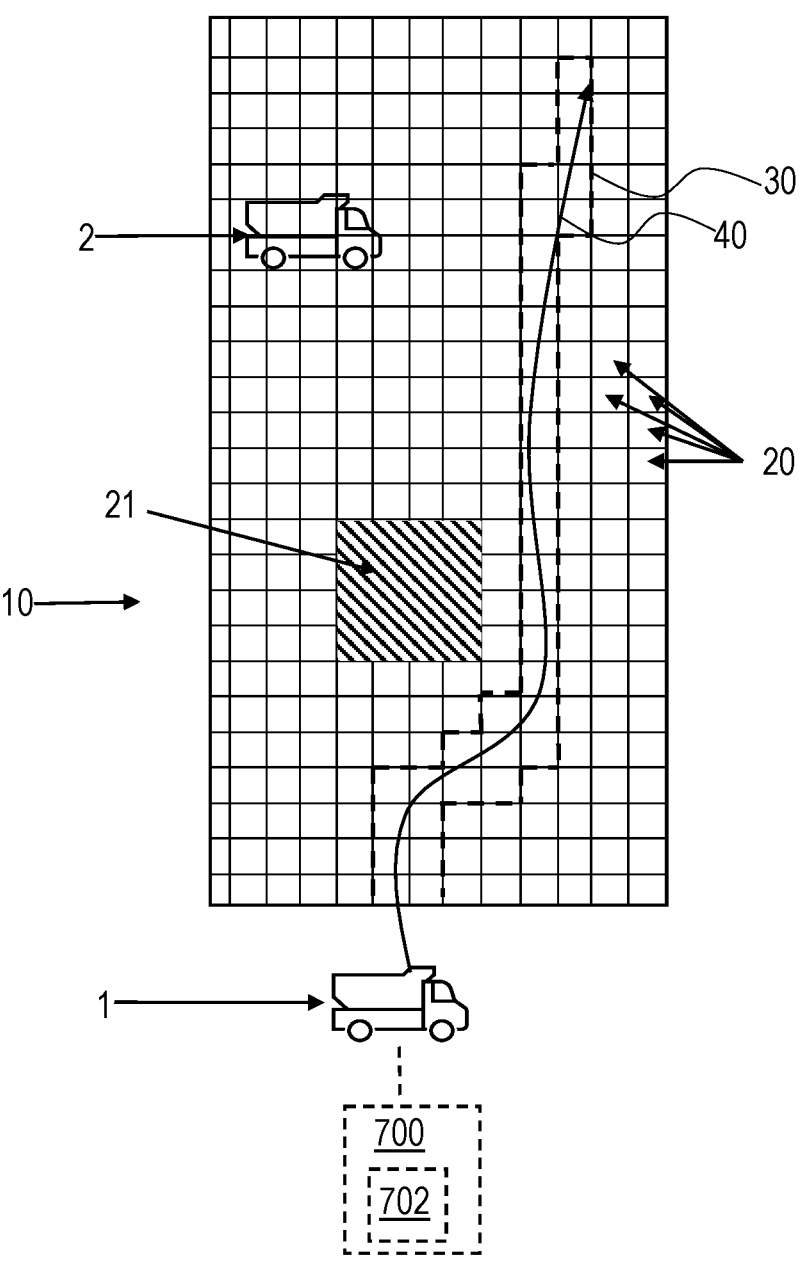
FIG. 1 is a diagram illustrating a vehicle and a determined path according to one example.

FIG. 1 is an exemplary scenario of embodiments herein according to one example. Embodiments herein relate to determining at least one travelling path 40 for at least one vehicle 1 on a drivable surface 10. The drivable surface 10 may comprise any surface which is be prone to wear, e.g., when travelled across by a vehicle, e.g., the at least one vehicle 1. In a particular example, the drivable surface 10 may comprise any surface which is easily affected by loads applied by vehicles, e.g., soft surfaces, such as any one or more out of: sand, gravel, mud, dirt, snow, areas with puddles/water, and/or a combination thereof.

The at least one vehicle 1 may comprise any suitable vehicle, e.g., one or more of a car, bus, heavy-duty vehicle, truck, construction equipment, etc. The at least one vehicle 1 may comprise one or more vehicles with wheels and/or one or more vehicles with crawler members.

The at least one travelling path 40 may be a path determined for the at least one vehicle 1 to reach a destination or to perform a mission. Additionally or alternatively, the at least one travelling path 40 may be determined based on a predefined path for the at least one vehicle 1. The predefined path may be a previously travelled and/or previously planned route for the at least one vehicle 1. In other words, the at least one travelling path 40 may be modelled to have at least partially the same locations to travel as the predefined path, e.g., with some offsets and changes as will be explained by exemplary embodiments herein.

As the drivable surface 10 may be prone to wear, exemplary embodiments herein may determine the at least one travelling path 40 to reduce wear on the drivable surface 10, e.g., compared to the predefined path. This is performed by considering a current wear of the drivable surface 10, and by determining the at least one travelling path 40 on a basis thereof. The at least one travelling path 40 may then be determined such that the at least one vehicle 1 will drive on parts of the drivable surface 10 which have low or no wear, such as to even out a distribution of wear of the drivable surface 10. When the drivable surface 10 is evenly worn, vehicles such as the at least one vehicle 1 will more easily drive over the drivable surface 10, as opposed to when it is unevenly worn which would cause potholes, wheel patterns, ruts, ridges, deformations and potholes, etc. Furthermore, when the drivable surface 10 is evenly worn, a lifetime of the drivable surface is increased as the drivable surface 10 can be used longer without repair.

As an example in FIG. 1, a worn-out area 21 is illustrated. The worn-out area 21 may be an area worn more than the rest of the drivable surface 10, and hence, the at least one travelling path 40 may be determined to go around the worn-out area 21, as illustrated in FIG. 1. The worn-out area 21 may for example be an area which have been travelled more times than other areas of the drivable surface 10.

To measure the wear of different parts of the drivable surface 10, many options are available. The drivable surface 10 is arranged to comprise a set of surface areas 20. The set of surface areas 20 comprises multiple surface areas, which may also be referred to as tiles. These surface areas each cover a part of the drivable surface 10 in any suitable shape or size such that the drivable surface 10 is represented by the set of surface areas 20. In FIG. 1, this is illustrated as a grid of surface areas, wherein the surface areas are each representing a same-sized part of the drivable surface 10, however, different sizes and shapes may be mixed in the set of surface areas 20 in any suitable manner. Each respective surface area out of the set of surface areas 20 may also have a dynamically set area size and/or a dynamically set shape. One or more of the respective surface areas out of the set of surface areas 20 may alternatively has a static predefined size or shape.

As an example, each surface area in the set of surface area may be a square with a set side length, e.g., 30 cm.

As another example, some areas with expected low wear, e.g., a long straight road, may comprise larger sized surface areas than in loading/unloading areas and/or in curves. For straight roads, the shape and size of the surface areas may comprise rectangles with an elongated side in a direction of travel of the straight road, and a short side to capture a difference in lateral position of the at least one vehicle 1.

When each respective surface area out of the set of surface areas 20 has a dynamically set size, the respective size of each surface area may be updated based on a need for maintenance and/or based on their indicated wear. For example, where wear is detected to be high or detected to repeatedly increase at a high rate, e.g., more than a threshold and/or more than other surface areas, the dynamically set size may be lowered, e.g., such as to split the surface area into two different surface areas.

The at least one travelling path 40 may then be determined based on the wear of the surface area 20. This means that the at least one travelling path 40 can be determined on a fine-granular level such as to avoid that wheels of the at least one vehicle 1 always drive on the same place, and/or to avoid generally worn-out surface areas. In the example of FIG. 1. this means that a resulting at least one travelling path 40 will be determined to extend through a subset of surface areas 30 out of the set of surface areas 20, e.g., depending on the wear of all of the different surface areas in the set of surface areas 20, respectively.

The wear of each surface area in the set of surface areas 20 may for example be obtained by obtaining how many times the respective surface area has been driven and/or how much total load has been applied to the surface area. Many aspects of determining and/or obtaining wear for each surface area exist, which will be further exemplified and explained by exemplary embodiments herein.

One or more second vehicles 2 may operate on the drivable surface 10. The one or more second vehicles 2 may be the same or different as the at least one vehicle 1. The one or more second vehicles 2 may comprise a subset of the at least one vehicle 1. The one or more second vehicles 2 may comprise vehicles which may measure the wear of one or more surface areas in the set of surface areas 20 by means of sensors attached to the one or more second vehicles 2, e.g., cameras etc. In other words, the one or more second vehicles 2 are capable of determining or estimating the wear of the set of surface areas 20 even if they have not travelled said surface areas. The one or more second vehicles 2 may respectively comprise a respective navigational system which accurately can locate the respective vehicle located the respective vehicle and its attached parts, and/or the surrounding surface areas with high precision, e.g., by an error margin smaller than a threshold such as less than 5 cm or sometimes with even finer resolution if necessary.

Embodiments herein may be performed at least partly by a computer system 700, and a processor device 702 therein. The computer system 700 may be comprised in the at least one vehicle 1, or may be at a remote location communicatively coupled to the at least one vehicle 1, e.g., in a server or control station e.g., which may be arranged to at least partly remotely control or provide instructions such as the at least one travelling path 40, to the at least one vehicle 1. The computer system 700 and/or the processor device 702 therein may be able to communicate with the at least one vehicle 1 and/or the one or more second vehicle 2, e.g., to obtain one or more indications of wear of the drivable surface 10. The computer system 700 and/or the processor device 702 therein may further, directly or indirectly, control and/or communicate with any suitable entity comprised in the at least one vehicle 1. The computer system 700 and/or the processor device 702 therein may further be able to select a candidate path for the first vehicle 1 to travel.

Figure 2:
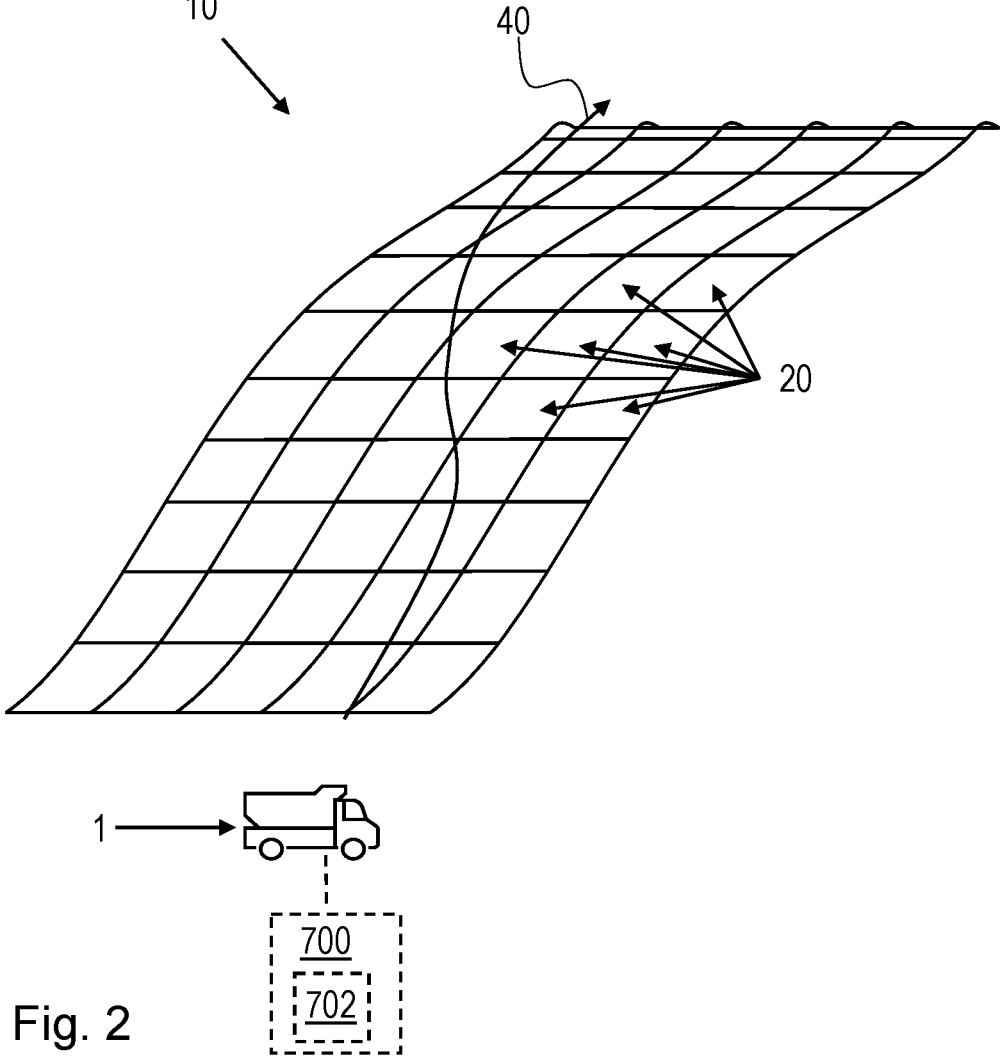
FIG. 2 is another view of FIG. 1, according to another example.

FIG. 2 is another view of FIG. 1, according to another example.

FIG. 2. Illustrates the computer system 700 comprising the processor device 702 configured to determine the at least one travelling path 40 for the at least one vehicle 1. The processor device 702 is further configured to obtain an indication of wear of the drivable surface 10. The drivable surface 10 comprises a set of surface areas 20. The indication of wear is indicative of a wear of each respective surface area in the set of surface areas 20.

The processor device 702 is further configured to, based on the indicated wear of the set of surface areas 20 of the drivable surface 10, determine the at least one travelling path 40 for the at least one vehicle 1.

Figure 3:
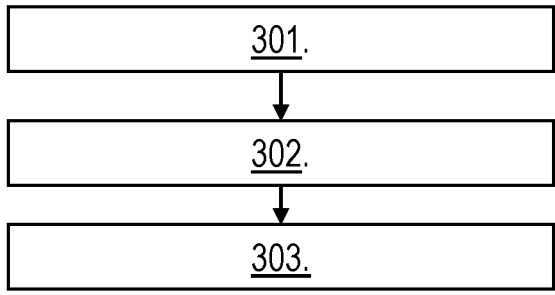
FIG. 3 is a flow chart of an exemplary method according to one example.

FIG. 3 is a flow chart of an exemplary computer-implemented method for determining the at least one travelling path 40 for the at least one vehicle 1. The method may be performed by the computer system 700, in particular the processor device 702. The method comprises the following actions, which actions may be taken in any suitable order.
Action 301

The method comprises, by the processor device 702 of the computer system 700, obtaining an indication of wear of the drivable surface 10 comprising the set of surface areas 20. The wear is indicative of a respective wear of each respective surface area in the set of surface areas 20.

The set of surface areas 20 may be arranged as a grid over the drivable surface 10. This may for example mean a representation wherein the set of surface areas 20 may be arranged to be extended along two directions of the drivable surface area 10 wherein each surface area is adjacent to another surface area in the set of surface areas.

Additionally or alternatively, the drivable surface 10 comprises one or more segments wherein each respective segment comprises at least two adjacent surface areas in at least two different directions of the respective segment. The two directions may e.g., be laterally and longitudinally with respect to a driving direction associated with the drivable surface 10. As there are at least two adjacent surface areas in each direction, a more fine-granular set of surfaces 20 is achieved.

As the set of surface areas 20 is more fine-granular, i.e. when the set of surface areas 20 is arranged to comprise an increased number of surfaces areas and/or surface areas of a smaller size, the resolution for distribution of wear in the drivable surface 10 is increased.

Each respective surface area out of the set of surface areas 20 may have a dynamically set area size. In other words, different surface areas in the set of surface areas 20 may be differently sized and/or may be of different shapes. The respective shapes and sizes may be any suitable shapes and sizes, e.g., such as to cover a suitable granularity of surface area.

The wear of each respective surface area in the set of surface areas 20 may be represented by a respective wear value, i.e. a quantified wear of the set of surface areas 20. Each respective wear value may be determined based on a wear caused by the one or more second vehicles 2 that have travelled across the respective surface area. For example, each one or more second vehicles 2 may measure or derive a wear value of a respective surface area in the set of surface area 20 and communicate the wear value or an indication of the wear value to the at least one vehicle 1, e.g., via the computer system 700. The communication of the wear value will further be explained with respect to FIG. 4.

The wear value may be determined based on any one or more suitable manner for quantifying wear on a respective surface area. The wear value may for example be determined based on any one or more out of:

a number of times the respective surface area has been travelled by a ground engaging member of the one or more second vehicles 2, a registered number of times the respective surface area has been travelled by a specific vehicle type, e.g., the registration may be performed by each vehicle travelling the respective surface area, at least one sensor measurement of the respective surface area, the at least one sensor measurement being performed by the one or more second vehicles 2, a total load that has been applied to the respective surface area by the one or more second vehicles 2, and/or a default wear value.

The number of times the respective surface area has been travelled by a ground engaging member of the one or more second vehicles 2 may comprise the one or more second vehicles 2 respectively measuring where they have driven their ground engaging members, e.g., on which surfaces in the set of surface areas 20. The ground engaging member may be a wheel or a crawler member depending on the type of vehicle. The one or more second vehicle 2 may perform this by the use of positioning sensors for the vehicle and/or the ground engaging members of the one or more second vehicles 2, e.g. using any one or more out of a Global Navigation Satellite Systems (GNSS) such as Global Positioning System (GPS), Light Detection and Ranging (Lidar), and cameras. The positioning sensors of the one or more second vehicle 2 may for example detect a position of the respective one or more second vehicle 2, and based on a predefined arrangement of the respective vehicle, it may be determined within a predefined error margin, where the ground engaging members of the respective vehicle is positioned. Thereby the one or more second vehicles 2 can with high accuracy and precision, determine where each ground engaging member of the respective vehicle has travelled, and thereby a wear value for a surface area in the set of surface areas 20 may be determined at least partially by counting the number of times the respective surface area has been travelled by a ground engaging member of the one or more second vehicles 2.

The at least one sensor measurement of the respective surface area, may be measured before or after the one or more second vehicles 2 travels across the respective surface area. As an alternative, the respective surface area may be measured to determine its wear value by the one or more second vehicles 2 from a distance.

The at least one sensor measurement may for example comprise a measurement of irregularity, e.g., with respect to any one or more other surface areas, e.g., adjacent to the respective surface area. For example, a wear value of the respective surface area may be determined to be based at least partly on the measured height difference to one or more other surface areas.

For example, the at least one sensor measurement of the respective surface area may comprise sensor data of a respective Inertial Measurement Unit (IMU) sensor of the one or more second vehicles 2, wherein the respective IMU sensor obtains IMU sensor data to estimate vibrations of a respective surface area. The IMU sensor may comprise an accelerometer. The wear value of the respective surface area may be determined to be based at least partly on the estimated vibrations. For example, patterns of the vibrations may be used to estimate a wear of the respective surface area.

Additionally or alternatively, the at least one sensor measurement of the respective surface area may comprise Lidar sensor data, e.g., indicating height differences of surface areas in the set of surface areas 20 and/or roughness of the respective surface area. The wear value of the respective surface area may be determined to be based at least partly on the Lidar sensor data.

In some examples, a wear value of the respective surface area may be determined to be based at least partly on a combination of the estimated vibrations from the IMU sensor and the Lidar sensor data.

The total load that has been applied to the respective surface area by the one or more second vehicles may for example be determined based on the number of times the respective surface area has been travelled and based on the load applied for each of the times the respective surface area was travelled. The load applied by each vehicle may for example be determined either by obtaining a total weight of the respective vehicle and/or by obtaining an indication of whether or not the respective vehicle is loaded or unloaded. For some examples, the total load applied to the respective surface area by the one or more second vehicles may for example be determined based on a load per axle of the one or more second vehicles travelling the respective surface area.

In some examples herein, the load applied by each respective vehicle out of the one or more second vehicle may depend on whether or not the respective vehicle is tracked, i.e. travels by the use of tracks, or whether or not the respective vehicle is wheeled, i.e. travels by the use of wheels.

The load applied to the respective surface area by a respective vehicle out of the one or more second vehicle 2 may for example be an estimation based on whether or not the respective vehicle is loaded or unloaded, e.g., by estimating a total load, e.g. based on a weight of the load and the vehicle, and/or by applying a predefined coefficient based on whether or not the vehicle is loaded and/or unloaded. A loaded vehicle may in some estimations be assumed to be fully loaded, and in such cases, a maximum allowed load for the respective vehicle may be used to estimate the load applied by the respective vehicle to the respective surface area.

The default wear value may be a value used initially and/or after maintenance of a respective surface area in the set of surface areas 20. An initial value may for example be 0. A default wear value after maintenance of the respective surface area may be higher than an initial value.

Maintenance of a respective surface area may be performed by the use of any one or more out of: a road grader, a wheel loader, a dozer, a truck with a snowplow, etc. The wear value for a respective surface area may be reset after maintenance performed on said respective surface area. Maintenance may include salting or watering the respective surface area. Maintenance may further include adding surface material to the respective surface area.

The default wear value may typically be predefined. The default wear value may typically be different based on the type of drivable surface in a respective surface area, e.g., based on whether or not the surface comprises sand, snow, dirt, etc.

The wear value may additionally or alternatively be determined at least partly based on one or more wear factors that have been applied to a respective surface area in the set of surface areas 20 when travelled by at least one respective vehicle out of the one or more second vehicles 2. In other words, the way the respective surface area is travelled may further affect the wear value of the respective surface area.

The one or more wear factors may comprise any one or more out of:
  a speed of the at least one respective vehicle,
  a longitudinal acceleration of the at least one respective vehicle,
  a lateral acceleration of the at least one respective vehicle,
  a type of the at least one respective vehicle,
  a weight of the at least one respective vehicle,
  a load of the at least one respective vehicle, e.g., including or excluding weight of the at least one respective vehicle,
  a surface type of the respective surface area, and
  an environmental status of the respective surface area when travelled by the at least one respective vehicle.

For example, e.g., a faster speed of the respective vehicle increases the wear of the respective surface area. A higher longitudinal acceleration, e.g., torque applied, in the respective vehicle increase the wear of the respective surface area. An increased lateral acceleration of the respective vehicle increases the wear value of the respective surface area. Furthermore, any one or more out of the load of the at least one respective vehicle, the surface type of the respective surface area, e.g., sand, dirt, snow, season such as winter or summer, etc., and the environmental status of the respective surface area, e.g., temperature and/or whether or not the respective surface area is wet or slippery, may affect the wear effect of the motion applied, e.g., speed/acceleration, of the at least one respective vehicle on the respective surface area.

The one or more wear factors and/or the above-mentioned parameters for defining the wear values, combined or independently, may be used in a predetermined model for determining the wear value of the respective surface area in the set of surface areas 20. I.e. any one or more of the above-mentioned parameters for defining the wear values of the set of surface areas 20 and/or the above-mentioned wear factors may be fed into a predetermined model, e.g., based on heuristics and/or machine learning, to output the respective wear value for each respective surface area.

In some exemplary embodiments, obtaining the indication of wear of the drivable surface 10 comprises obtaining a wear for each respective surface area in the set of surface areas 20, e.g., by receiving, from the at least one respective vehicle out of the one or more second vehicles 2, a respective indication of wear of the drivable surface 10.

In some examples, the indication of wear may be based on, and/or adjusted based on a wheel type of the wheels of the respective vehicle out of the one or more second vehicles 2, e.g., whether the wheels of the respective vehicle are any one or more out of: steered wheels, driven wheels, and non-driven wheels.

In some exemplary embodiments, obtaining the wear of the drivable surface 10 comprises receiving an indication of wear for different subsets of surface areas in the set of surface areas 20 from different respective vehicles of the one or more second vehicles 2. In other words, one vehicle in the one or more second vehicles 2 may report wear, e.g., first wear values, of a first subset of surface areas, and another vehicle in the one or more second vehicles 2 may report wear, e.g., second wear values, of a second subset of surface areas. The first and second subsets of surface areas may or may not overlap.

When receiving the indication of wear for respective surface areas in the set of surface areas 20, obtaining the indication of wear for the respective surface area may comprise combining the different indications of wear. For example, two different vehicles in the one or more second vehicles 2 may indicates respective number of times they have travelled the respective surface area and/or a respective load they have applied to the respective surface area, as respective wear values. In these exemplary embodiments, obtaining the indication of wear for the respective surface area may comprise adding the respective number of wear values.

The indication of wear may for example be measured by sensors of the at least one respective vehicle and/or indicate a number of times and/or load applied to the respective surface areas in the set of surface areas. When no wear has been measured and/or have not been caused by the at least one respective vehicle, no report for the respective surface area is necessary and a previous or default value may be assumed.

In some examples, multiple methods for determining the wear in the set of surface areas 20 may be performed for redundancy, calibration, verification, and/or for estimating an accuracy of the wear of a respective surface area in the set of surface areas 20. For example, if the number of times that one or more vehicles have travelled a respective surface area indicates a first wear, e.g., a first wear value, and a sensor estimation, e.g., by the use of a camera and/or IMU/accelerometer, indicates a second wear, e.g., a second wear value, of the respective surface area, and wherein the first wear indicates that the respective surface area is worn out, e.g., a high wear value above a threshold, and the second wear indicates that the respective surface area is not worn out, e.g., a low wear value below a threshold, then the accuracy of the indicated wear may be low and the surface area may need to be assumed to have the first wear.

Action 302

The method comprises, by the processor device 702, based on the indicated wear of the set of surface areas 20 of the drivable surface 10, determining the at least one travelling path 40 for the at least one vehicle 1.

Determining the at least one travelling path 40 for the at least one vehicle 1 may comprise determining the at least one travelling path 40 such that a resulting wear of the set of surface areas 20 of the drivable surface 10 is to be distributed as evenly as possible, e.g., by determining the at least one travelling path 40 to extend over surface areas of low wear, e.g., lower than a first predefined threshold, and while determining the at least one travelling path 40 to refrain from extending over surface areas of high wear, e.g., higher than a second predefined threshold.

Determining the at least one travelling path 40 may comprise determining multiple travelling paths for different vehicles part of the at least one vehicle 1. In such a scenario, the multiple travelling paths are determined such that a resulting wear of the set of surface areas 20 of the drivable surface 10 is to be distributed as evenly as possible.

Determining the at least one travelling path 40 for the at least one vehicle 1 may for example comprise determining at least one travelling path which causes each respective vehicle of the at least one vehicle 1 to travel over a subset of surface areas out of the set of surface areas 20. The respective subset of surface areas 30 fulfils a first condition. Fulfilling the first condition may comprise any one or more out of:

that the subset of surface areas 30 comprises at least one surface area which from the set of surface areas 20 has a lowest wear value,
   that each surface area in subset of surface areas 30 has a respective wear value lower than an average wear value of the set of surface areas 20,
   that each surface area in subset of surface areas 30 has a respective wear value lower than or equal to a wear value of an adjacent surface area,
   that the wear values within the subset of surface areas 30 are lower than a maximum wear value,
   that a total wear value of the subset of surface areas 30 is less than an alternative total wear value for an alternative travelling path comprising an alternative set of surface areas 20,
   that at least one surface area in the set of surfaces areas which is prone to an increased wear is excluded from the subset of surface areas 20,
   that the at least one travelling path 40 comprises a lower number of high wear operations than an alternative travelling path, the high wear operations causing a vehicle to induce higher wear on a surface area than for an alternative operation, and
   that a difference in wear values of one or more adjacent areas out of the set of surface areas 20 is lowered.

The total wear value may be represented by an average wear value and/or an aggregated wear value, i.e. a total sum and/or an average of all wear values in the subset of surface areas 30.

The high wear operations may comprise any one or more out of:

a sharp turn, e.g., a turn in a respective surface area by more than an angle and/or turning radius over a set distance and/or time,
   a yaw rate above a predefined yaw threshold for a respective surface area in the set of surface areas 20,
   a speed exceeding a speed threshold for a respective surface area in the set of surface areas 20, and
   an acceleration, e.g., longitudinal or lateral acceleration exceeding an acceleration threshold for a respective surface area in the set of surface areas 20.

In the above options, the distribution of wear in the set of surface areas 20 is improved to be distributed more evenly.

The at least one surface area in the set of surfaces areas which is prone to an increased wear may be identified by previous measurements and/or previous wear values. For example, the wear values of the at least one surface area may have previously been identified to increase faster and to higher levels than other surface areas in the set of surface areas 20, e.g., compared to a change of wear in an average surface area in the set of surface areas 20. It may also be predefined that the at least one surface area is prone to an increased wear. For example, it may be predefined that some type of surface areas, e.g., comprising a combination of features such as certain curves, road inclinations, surface types, may always be prone to an increased wear, and wherein surface areas of the set of surface areas 20 comprising such combination of features may always be identified to be prone to an increased wear.

Determining the at least one travelling path 40 for the at least one vehicle 1 may additionally or alternatively comprise determining a first travelling path for a first vehicle and a second travelling path for a second vehicle. The first vehicle is in these exemplary embodiments arranged to cause more wear than the second vehicle. These exemplary embodiments may then comprise determining the first travelling path, wherein the first travelling path causes the first vehicle to travel over a first subset of surface areas out of the set of surface areas 20. A wear of the first subset of surface areas 30 may be represented by a first total wear value, e.g., an average or aggregate value of the wear values of the first subset of surface areas. These exemplary embodiments may then comprise determining the second travelling path, wherein the second travelling path causes the second vehicle to travel over a second subset of surface areas out of the set of surface areas 20. A wear of the second subset of surface areas may be represented by a second total wear value, e.g., an average or aggregate value of the wear values of the second subset of surface areas. In these exemplary embodiments, the first total wear value is lower than the second total wear value. In this way, a more even distribution of wear in the drivable surface 10 is achieved, i.e. as the first vehicle causing a higher wear will travel the at least one travelling path on lower wear values than the second vehicle causing the lower wear.

Since the at least one travelling path 40 is determined to comprise travel on low wear surface areas of the set of surface areas 20, maintenance of the drivable surface area 10 can be deferred e.g., until a respective tile is travelled predefined number of maximum allowed times. This allows the at least one vehicle 1 to have full productivity for a larger amount of time and to travel more times across the drivable surface 10 before maintenance is needed.

Action 303

The method may further comprise triggering the at least one vehicle 1 to travel the determined at least one travelling path 40.

In some exemplary embodiments, to more efficiently even out the set of surface areas 20, the at least one vehicle may be triggered to travel the at least one travelling path 40 with a fixed minimum and/or maximum speed for each respective surface area of the at least one travelling path 40. For example, for a set of combination of curves in the set of surface areas 20, triggering the at least one vehicle 1 to travel the at least one travelling path 40 may comprise triggering the at least one vehicle 1 to travel through surface areas of the set of combination of curves with a minimum speed, as to further even out wear for the surface areas of the combination of curves. This may for example be an advantage when ridges have been formed in the combination of curves which may be evened out, e.g., flattened, by the at least one vehicle 1 travelling over the ridges, e.g., in a transverse direction.

Figure 4:
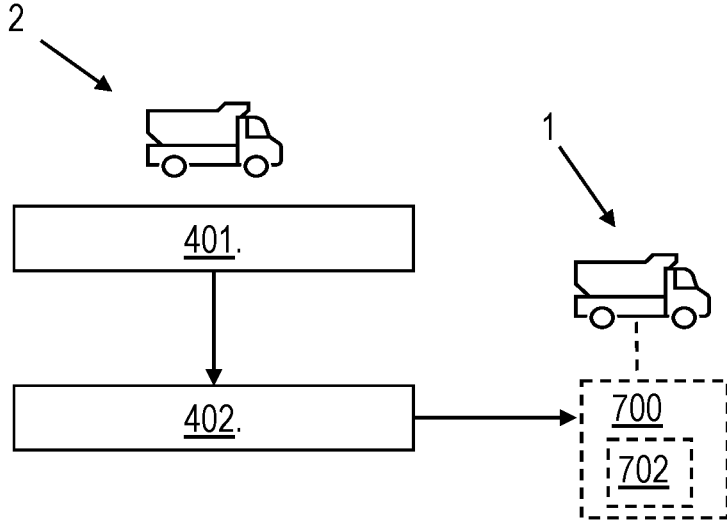
FIG. 4 is a flow chart of an exemplary method according to one example.

FIG. 4 is a flow chart of an exemplary method performed by a respective second vehicle out of the one or more second vehicles 2 for communicating wear of one or more surface areas of the set of surface areas 20, e.g., as received in action 301. The method may be performed by each of the vehicles in the one or more second vehicles 2. The method may comprise any one or more out of the following actions which actions may be taken in any suitable order.

Action 401

The method may comprise obtaining a wear for at least one respective surface area in the set of surface areas 20, e.g., as described in action 301. Obtaining the wear for the at least one respective surface area in the set of surface areas 20 may comprise determining a wear value for the respective surface area, e.g., by determining a number of times the respective second vehicle out of the one or more second vehicles 2 has travelled the at least one respective surface area and/or by determining a load applied by the respective second vehicle to the at least one respective surface area.

Additionally or alternatively, e.g., as described in action 301, obtaining the wear, e.g., the wear value, for the at least one respective surface area may comprise using sensors of the respective second vehicle, e.g., a camera or lidar, to measure the at least one respective surface area, e.g., with respect to height differences from other surface areas such as adjacent surface areas.

Additionally or alternatively, e.g., as described in action 301, obtaining the wear, e.g., the wear value, for the at least one respective surface area may comprise determining the one or more wear factors applied when the respective second vehicle travelled the at least one respective surface area.

The methods according to Action 401 may be performed when the respective vehicle is travelling a travelling path, e.g., as determined in action 302, e.g., as part of the at least one travelling path 40. In other words, the method described herein with respect to FIG. 4. may be performed iteratively in combination with the method according to actions 301-303. This means that a travelling path may be determined for the respective second vehicle, e.g., as in action 302, and the respective second vehicle may be triggered to travel said travelling path, e.g., as in action 303, and during travelling of said travelling path, the respective second vehicle may obtain the wear, e.g., wear value, of surface areas in the set of surface areas 20 of said travelling path and/or of surrounding surface areas in the set of surface areas 20 which are measurable by the sensors of the respective second vehicle when travelling said travelling path. In these exemplary embodiments, the respective second vehicle may be part of the at least one vehicle 1. However, for alternative exemplary embodiments, the respective second vehicle may also be any other suitable vehicle arranged to travel across at least parts of the set of surface areas 20.

A precise position of each tire of the respective second vehicle may be tracked by the respective second vehicle, and thereby any bias in control errors may be considered when obtaining the wear for the at least one respective surface area in the set of surface areas 20. In other words, while the respective second vehicle may travel a path as determined by action 302, it is the wear of the surface areas actually travelled that is obtained.

Action 402

The method may further comprise transmitting an indication of the wear for at least one respective surface to the computer system 700, e.g. comprised in server, control station, or in any one of the at least one vehicle 1, e.g., as explained in action 401, and with further reference to action 301 above. Transmitting the indication of the wear may comprise transmitting a wear value. In this way, the computer system 700, e.g., the processor device 702, may be able to obtain the indication of wear, e.g., as in action 301.

Figure 5:
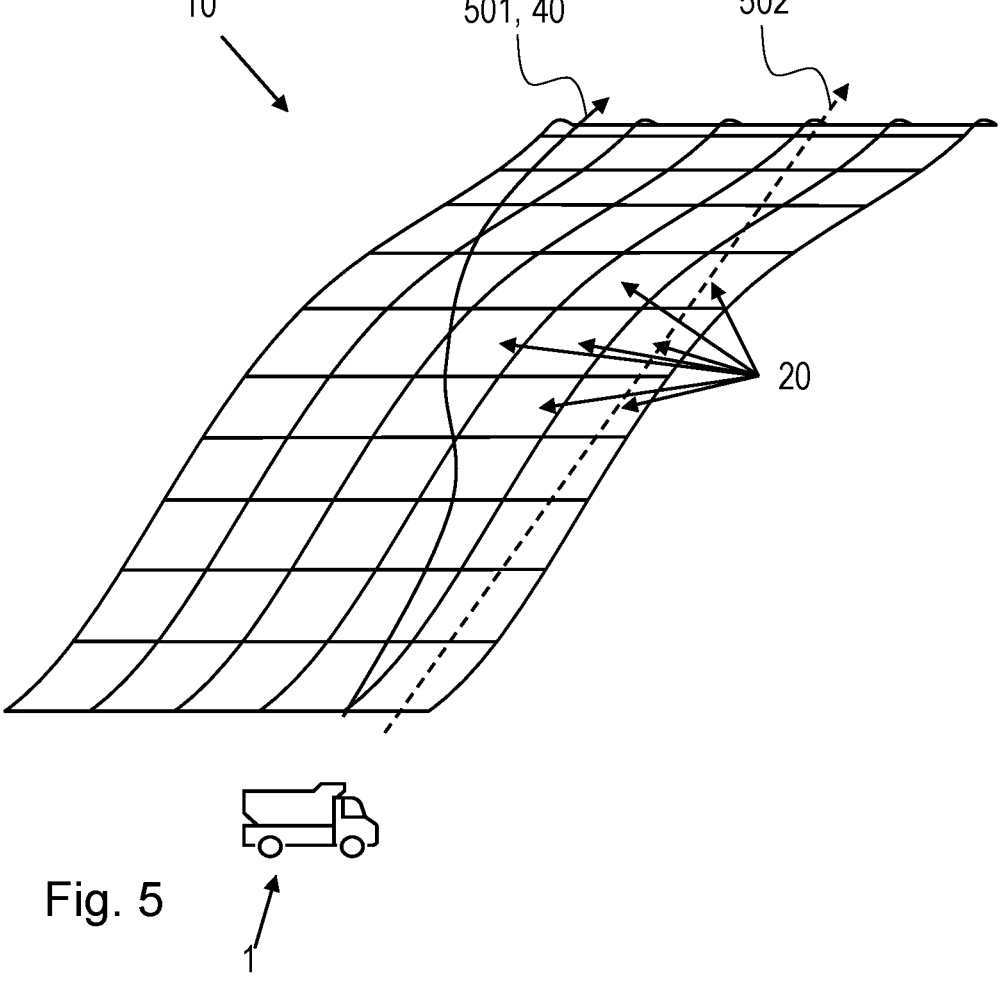
FIG. 5 is a diagram illustrating a comparison of paths with regards to wear.

FIG. 5 is a diagram illustrating an example scenario of comparison of different candidate paths with regards to wear of the set of surface areas in the drivable surface 10. The candidate paths comprise a first candidate path 501 and a second candidate path 502. Each respective candidate path 501, 502 is associated with a subset of surface areas in the set of surface area 20 which the at least one first vehicle 1 shall travel when travelling said candidate path. In this example scenario, determining the at least one travelling path 40 over the set of surface areas 20 may comprise generating and comparing the first candidate path 501 with the second candidate path 502. Based on this comparison, the path with the lowest wear may be determined to be part of the at least one travelling path 40, e.g., as part of action 302. In this example, the first candidate path 501 may be determined to have less wear than the second candidate path 502. This means for example that the first candidate path 501 may, in its associated subset of surface areas, have a lower average wear, e.g., wear values, than the corresponding subset of surface areas associated with the second candidate path 502. As an alternative, the first candidate path 501 may have a lower lowest wear value in its subset of surface areas compared to the second candidate path 502. As an alternative, the first candidate path 501 may have a lower highest wear value in its subset of surface areas compared to the second candidate path 502. Furthermore, any suitable heuristics for selecting the lowest wear candidate path may apply, e.g., with respect to wear values for the respective subset of surface areas.

Figure 6:
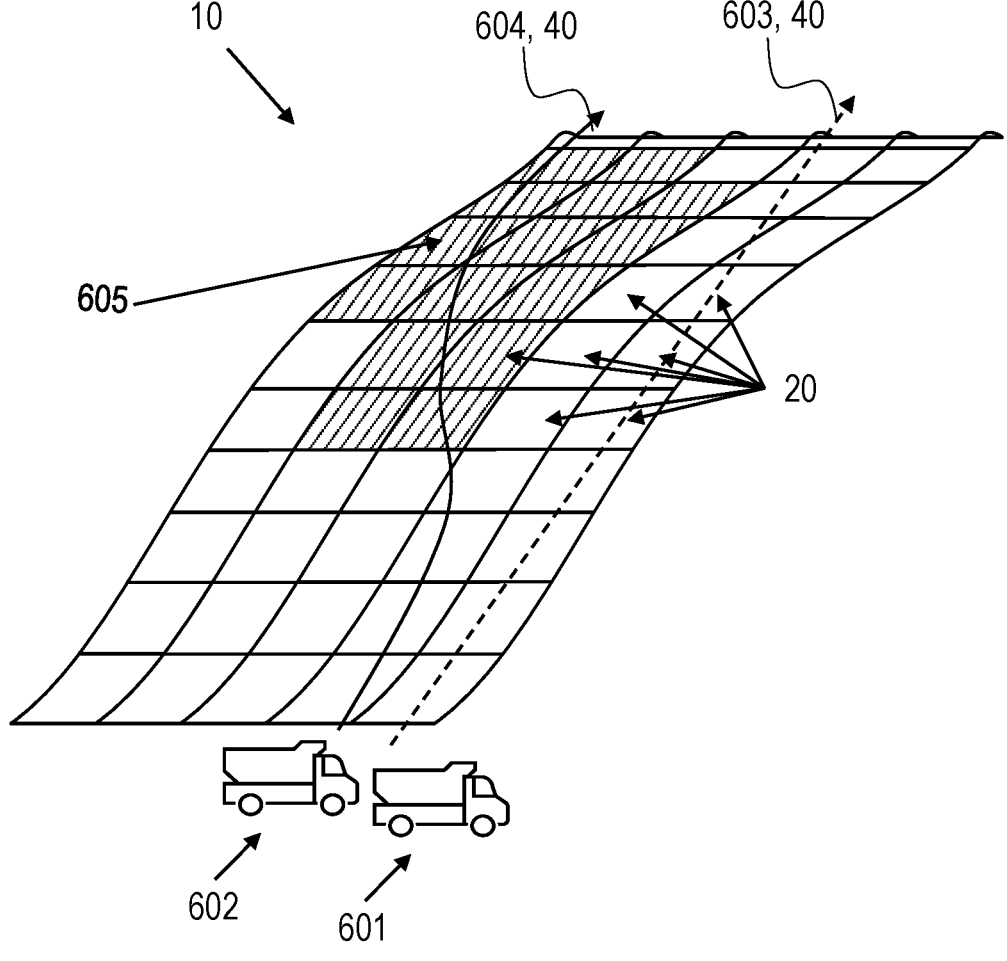
FIG. 6 is a diagram illustrating a determination of different paths for different vehicles.

FIG. 6 is a diagram illustrating an example scenario of determining different paths for two different vehicles in the at least one vehicle 1, e.g., as in action 302. In this example scenario, the at least one vehicle 1 comprises a first vehicle 601 and a second vehicle 602.

In this scenario, two candidate paths are determined for the first and second vehicles 601, 602, a first travelling path 603, and a second travelling path 604, In this scenario, the set of surface areas 20 may further comprise a set of higher wear surface areas 605, which set of higher wear surface areas 605 comprises respective surface areas with a wear value of below a predefined threshold. The second travelling path 604 is traversing the set of higher wear surface areas 605, meaning that in this scenario, the second travelling path 604 is considered to have more wear than the first travelling path 603.

In this example, the first vehicle 601 is arranged to cause more wear than the second vehicle 602. In other words, the first vehicle 601 may apply more load to drivable surface 10, when travelling over the drivable surface 10. The reason why the first vehicle 601 may apply more load to the drivable surface 10 may be many, e.g., any one or more out of:

the first vehicle 601 may be loaded while the second vehicle 602 is unloaded, the first vehicle 601 may be heavier than the second vehicle 602, a vehicle type of the first vehicle 601 may be associated with a higher wear than a vehicle type of the second vehicle 602, historical wear measurements indicates that the first vehicle 601 may be associated with a higher wear than the second vehicle 602, the first vehicle 601 may drive faster than the second vehicle 602, the first vehicle 601 may have a higher load on a highest loaded axle than the second vehicle 602, the first vehicle 601 may have a different number of axles than the second vehicle 602, the first vehicle 601 may have a different sized tires than the second vehicle 602, the first vehicle 601 may have a different number of drive shafts than the second vehicle 602, and the first vehicle 601 may have higher acceleration than the second vehicle 602.

Since the first vehicle 601 is arranged to cause more wear than the second vehicle 602, determining the at least one travelling path 40, e.g., as in action 302 comprises determining that the first vehicle 601 is to travel the first travelling path 603, and that the second vehicle 602 is to travel the second travelling path 604. In this way, the set of surface areas 20 will maintain a more even wear of the surface areas in the set of surface areas 20.

Variations and Further Exemplary Embodiments

Embodiments herein may at least partially spread a load applied by the at least one vehicle 1 equally across the set of surface areas 20 over a set time period, e.g., if one vehicle is driving a similar path iteratively the at least one predefined path 40 will be determined to comprise travelling different surface areas in the set of surface areas 20 for each iteration.

The time period may for example be per hour, day, work shift or even a longer time period. The period may be reset after a maintenance, i.e. a restoration of the set of surface areas 20, and/or after a significant change of weather conditions or temperature, e.g., after detecting a heavy rainfall has occurred.

By using a log data of the overpasses and accumulated load per surface area, e.g., the wear values of the set of surface area 20, in combination with an obtained interval of maintenance of the set of surface areas 20, exemplary embodiments herein may further comprise predicting when a maintenance is necessary. An alert may be triggered when predicting that the maintenance is necessary. Additionally or alternatively, the at least one vehicle 1 may be triggered to not travel to a specific area during the maintenance period.

The prediction may and/or the wear values of the set of surface areas 20 may further be presented to an operator of a control station, e.g., comprising the computer system 700, to present warnings, alerts and/or indications of when maintenance is needed.

The need of maintenance may be dependent on an amount of environmental status such as rain, snow, and temperature. The environmental status may be obtained by the at least one vehicle 1 and/or the one or more second vehicles 2. Alternatively, the environmental status may be obtained by an external entity reporting the environmental status of a geographical location comprising the drivable surface 10.

Based on the environmental status, a prediction of a maximum number of times a surface area in the set of surface areas 20 can be travelled before a maintenance is needed. The prediction may be performed in any suitable manner, for example using machine learning and training a machine learning model on the environmental status, number of times a surface area has been travelled, and a ground truth for when maintenance is needed, e.g., as evaluated by a professional user.

The prediction may factor that some surface areas, e.g., of certain types may be more durable than others, and hence, the maximum number of times a respective surface area can be travelled may differ for each respective surface area in the set of surface areas 20.

In this way, maintenance can be triggered according to a wear value of the set of surface areas. For example, after triggering the at least one vehicle to travel the travelling path 40, e.g., as in action 303, it may be known that at least one surface area in the set of surface areas 20 will reach the predicted maximum number of times the surface area can be travelled before maintenance is needed. Hence, in response to triggering the at least one vehicle 1 to travel the travelling path 40, a maintenance of the set of surface areas 20 may be triggered. Triggering the maintenance may comprise triggering the at least one vehicle to travel to a certain location and/or to stop during the maintenance.

Triggering the maintenance may comprise triggering a maintenance of all surface areas in the set of surface areas or only the surface areas which have reached the maximum number of times the surface area in the set of surface areas 20 can be travelled before the maintenance is needed.

Embodiments herein may allow for a mission planning of the at least one vehicle 1 to be adjusted to travel on surface areas in the set of surface areas 20 which are known to be less travelled than other surface areas. A predefined path of the at least one vehicle 1 may be adjusted to be the at least one travelling path 40, e.g., as determined in action 302. For a straight road the at least one travelling path may be determined to be the predefined path altered simply by an offset from the intended path while for a curve, such an approach may not be possible since turning the at least one vehicle 1 in a curve may cause exaggerated wear and therefore different approaches may be needed to smoothen the wear of the curve. One example would be to change an offset of the predefined path throughout the curve e.g., depending on a current where in the set of surface areas 20, and/or a curvature through the curve may need to be different to avoid exaggerated wear.

In any of the above-mentioned examples and/or embodiments, wear and/or wear values may, additionally or alternatively, may be obtained by one or more vehicles, e.g., the at least one vehicle 1 and/or the one or more second vehicles 2, being configured to respectively measure or estimate a load applied to, or applied by, each respective axle and/or wheel of the respective vehicle. A wear and/or wear value of the set of surface areas 20 may be determined at least partly by the respective load applied to, or applied by each respective axle and/or wheel of the respective vehicle. The respective load applied to, or applied by each respective axle and/or wheel of the respective vehicle may be obtained by sensors arranged on the respective vehicle, wherein the sensors may measure the axle load and/or weight. Additionally or alternatively, the respective load applied to, or applied by each respective axle and/or wheel of the respective vehicle may be estimated based on an axle configuration of the respective vehicle. The respective load may be mapped to the axle configuration of the respective vehicle to estimate the load distribution, i.e. the load applied by or applied to each respective axle and/or wheel of the respective vehicle. In this way, the wear and/or wear value may be minimized and/or accounted for with respect to each axle's and/or wheel-pair estimated and/or measured exposure on the set of surface areas 20.

The estimation may be based on any one or more out of:
an axle configuration of the respective vehicle including the positions of the wheels of the respective vehicle,
an initial weight of the respective vehicle, e.g., an unloaded weight of the respective vehicle,
a current weight of the respective vehicle, e.g., a loaded weight of the respective vehicle, the current weight of the respective vehicle may be measured by a weight sensor on the respective vehicle, by a weighing station, and/or by a machine loading the respective vehicle, e.g., construction equipment, excavator, wheel loader, etc.

Furthermore, the wear and/or wear value may be adjusted depending on a wheel type of the wheels of the respective vehicle, e.g., whether the wheels of the respective vehicle are steered wheels, driven wheels, or non-driven wheels.

The wear and/or may be registered by the respectively vehicle, e.g., in the computer system 700, e.g., and may further be obtained in actions 301, 401. In some embodiments, only wear and/or wear values above a preset threshold is registered. This means that for some examples, only wear and/or wear values above the preset threshold is obtainable by actions 301, 401.

Figure 7:
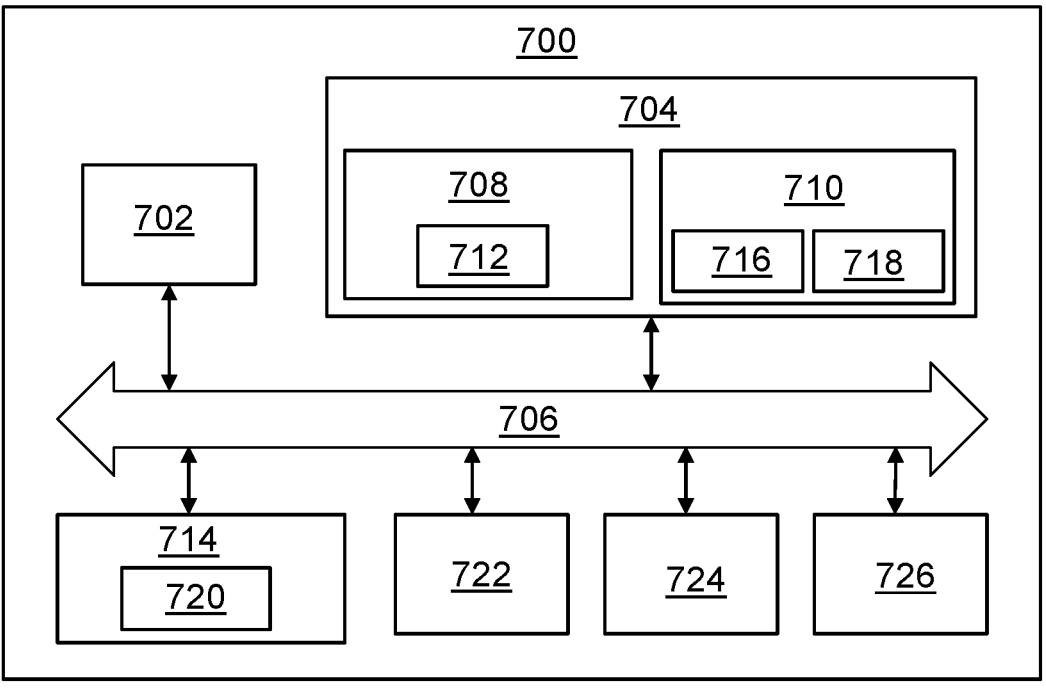
FIG. 7 is a schematic diagram of an exemplary computer system for implementing examples disclosed herein, according to one example.

FIG. 7 is a schematic diagram of the computer system 700 for implementing examples disclosed herein. The computer system 700 is adapted to execute instructions from a computer-readable medium to perform these and/or any of the functions or processing described herein. The computer system 700 may be connected (e.g., networked) to other machines in a LAN, an intranet, an extranet, or the Internet. While only a single device is illustrated, the computer system 700 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 700 may comprise at least one computing device or electronic device capable of including firmware, hardware, and/or executing software instructions to implement the functionality described herein. The computer system 700 may include the processor device 702 (may also be referred to as a control unit), a memory 704, and a system bus 706. The computer system 700 may include at least one computing device having the processor device 702. The system bus 706 provides an interface for system components including, but not limited to, the memory 704 and the processor device 702. The processor device 702 may include any number of hardware components for conducting data or signal processing or for executing computer code stored in memory 704. The processor device 702 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 706 may be any of several types of bus structures that may further interconnect to a memory bus (with or without a memory controller), a peripheral bus, and/or a local bus using any of a variety of bus architectures. The memory 704 may be one or more devices for storing data and/or computer code for completing or facilitating methods described herein. The memory 704 may include database components, object code components, script components, or other types of information structure for supporting the various activities herein. Any distributed or local memory device may be utilized with the systems and methods of this description. The memory 704 may be communicably connected to the processor device 702 (e.g., via a circuit or any other wired, wireless, or network connection) and may include computer code for executing one or more processes described herein. The memory 704 may include non-volatile memory 708 (e.g., read-only memory (ROM), erasable programmable read-only memory (EPROM), electrically erasable programmable read-only memory (EEPROM), etc.), and volatile memory 710 (e.g., random-access memory (RAM)), or any other medium which can be used to carry or store desired program code in the form of machine-executable instructions or data structures and which can be accessed by a computer or other machine with a processor device 702. A basic input/output system (BIOS) 712 may be stored in the non-volatile memory 708 and can include the basic routines that help to transfer information between elements within the computer system 700.

The computer system 700 may further include or be coupled to a non-transitory computer-readable storage medium such as the storage device 714, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 714 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 714 and/or in the volatile memory 710, which may include an operating system 716 and/or one or more program modules 718. All or a portion of the examples disclosed herein may be implemented as a computer program product 720 stored on a transitory or non-transitory computer-usable or computer-readable storage medium (e.g., single medium or multiple media), such as the storage device 714, which includes complex programming instructions (e.g., complex computer-readable program code) to cause the processor device 702 to carry out the steps described herein. Thus, the computer-readable program code can comprise software instructions for implementing the functionality of the examples described herein when executed by the processor device 702. The processor device 702 may serve as a controller or control system for the computer system 700 that is to implement the functionality described herein.

The computer system 700 also may include an input device interface 722 (e.g., input device interface and/or output device interface). The input device interface 722 may be configured to receive input and selections to be communicated to the computer system 700 when executing instructions, such as from a keyboard, mouse, touch-sensitive surface, etc. Such input devices may be connected to the processor device 702 through the input device interface 722 coupled to the system bus 706 but can be connected through other interfaces such as a parallel port, an Institute of Electrical and Electronic Engineers (IEEE) 1394 serial port, a Universal Serial Bus (USB) port, an IR interface, and the like. The computer system 700 may include an output device interface 724 configured to forward output, such as to a display, a video display unit (e.g., a liquid crystal display (LCD) or a cathode ray tube (CRT)). The computer system 700 may also include a communications interface 726 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A computer system comprising a processor device configured to determine at least one travelling path for at least one vehicle, wherein the processor device is further configured to:

obtain an indication of wear of a drivable surface, the drivable surface comprising a set of surface areas, and wherein the indication of wear is indicative of a wear of each respective surface area in the set of surface areas, based on the indicated wear of the set of surface areas of the drivable surface, determine the at least one travelling path for the at least one vehicle, wherein determining the at least one travelling path for the at least one vehicle comprises determining at least one travelling path which causes each of the at least one vehicle to travel over a subset of surface areas out of the set of surface areas, wherein each subset of surface areas fulfils a first condition, and wherein fulfilling the first condition comprises that the at least one travelling path comprises a lower number of high wear operations than an alternative travelling path, the high wear operations causing a vehicle to induce higher wear on a surface area than for an alternative operation; and trigger the at least one vehicle to travel the determined at least one travelling path.

2. A computer-implemented method for determining at least one travelling path for at least one vehicle, the method further comprising:

by a processor device of a computer system, obtaining an indication of wear of a drivable surface comprising a set of surface areas, and wherein the wear is indicative of a respective wear of each respective surface area in the set of surface areas, by the processor device, based on the indicated wear of the set of surface areas of the drivable surface, determining the at least one travelling path for the at least one vehicle wherein determining the at least one travelling path for the at least one vehicle comprises determining at least one travelling path which causes each of the at least one vehicle to travel over a subset of surface areas out of the set of surface areas, wherein each subset of surface areas fulfils a first condition, and wherein fulfilling the first condition comprises that the at least one travelling path comprises a lower number of high wear operations than an alternative travelling path, the high wear operations causing a vehicle to induce higher wear on a surface area than for an alternative operation; and by the processor device, triggering the at least one vehicle to travel the determined at least one travelling path.

3. The method of claim 2, wherein the set of surface areas are arranged as a grid over the drivable surface and/or wherein the drivable surface comprises one or more segments wherein each respective segment comprises at least two adjacent surface areas in at least two different directions of the respective segment.

4. The method of claim 2, wherein the wear of each respective surface area is represented by a respective wear value, and wherein each respective wear value is determined based on a wear caused by one or more second vehicles that have travelled across the respective surface area.

5. The method of claim 4, wherein the wear value is determined based on any one or more out of:

a number of times the respective surface area has been travelled by a ground engaging member of the one or more second vehicles that have travelled across the respective surface area, at least one sensor measurement of the respective surface area, the at least one sensor measurement being performed by the one or more second vehicles that have travelled across the respective surface area, a total load that has been applied to the respective surface area by the one or more second vehicles that have travelled across the respective surface area, and/or a default wear value.

6. The method of claim 4, wherein the wear value is determined at least partly based on one or more wear factors that have been applied to the respective surface area when travelled by at least one respective vehicle out of the one or more second vehicles that have travelled across the respective surface area, the one or more wear factors comprising any one or more out of:

a speed of the at least one respective vehicle, a longitudinal acceleration of the at least one respective vehicle, a lateral acceleration of the at least one respective vehicle, a type of the at least one respective vehicle, a weight of the at least one respective vehicle, a load of the at least one respective vehicle, a surface type of the respective surface area, and an environmental status of the respective surface area when travelled by the at least one respective vehicle.

7. The method of claim 2, wherein the determining the at least one travelling path for the at least one vehicle comprises determining at least one travelling path which causes each of the at least one vehicle to travel over a subset of surface areas out of the set of surface areas, wherein each subset of surface areas fulfils the first condition.

8. The method of claim 7, wherein fulfilling the first condition further comprises any one or more out of:

that the subset of surface areas comprises at least one surface area which from the set of surface areas has a lowest wear value, that the wear values within the subset of surface areas are lower than a maximum wear value, that a total wear value of the subset of surface areas is less than an alternative total wear value for an alternative travelling path comprising an alternative set of surface areas, that at least one surface area in the set of surfaces areas which is prone to an increased wear is excluded from the subset of surface areas, and that a difference in wear values of one or more adjacent areas out of the set of surface areas is lowered.

9. The method of claim 2, wherein determining the at least one travelling path for the at least one vehicle comprises determining a first travelling path for a first vehicle and a second travelling path for a second vehicle, wherein the first vehicle is arranged to cause more wear than the second vehicle, and determining a first travelling path which causes the first vehicle to travel over a first subset of surface areas out of the set of surface areas, wherein a wear of the first subset of surface areas is represented by a first total wear value, and determining a second travelling path which causes the second vehicle to travel over a second subset of surface areas out of the set of surface areas, wherein a wear of the second subset of surface areas is represented by a second total wear value, wherein the first total wear value is lower than the second total wear value.

10. The method of claim 2, wherein obtaining the indication of wear of the drivable surface comprises obtaining a wear for each respective surface area by receiving, from at least one respective vehicle out of one or more second vehicles, a respective indication of wear of the drivable surface.

11. The method of claim 2, wherein each respective surface area out of the set of surface areas has a dynamically set area size.

12. A vehicle comprising the processor device to perform the method of claim 2.

13. A control system comprising one or more control units configured to perform the method of claim 2.

14. A non-transitory computer-readable storage medium comprising instructions, which when executed by the processor device, cause the processor device to perform the method of claim 2.

* * * * *